(12) United States Patent
Schmitz et al.

(10) Patent No.: US 6,797,296 B2
(45) Date of Patent: Sep. 28, 2004

(54) FOOD PRODUCT PORTIONING

(75) Inventors: Brian Schmitz, New Holstein, WI (US); Jeff E. Morley, Kiel, WI (US); Mark P. Petrouske, Green Bay, WI (US)

(73) Assignee: Stoelting, LLC, Kiel, WI (US)

( * ) Notice: Subject to any disclaimer, the term of this patent is extended or adjusted under 35 U.S.C. 154(b) by 440 days.

(21) Appl. No.: 09/965,344

(22) Filed: Sep. 27, 2001

(65) Prior Publication Data

US 2002/0083847 A1 Jul. 4, 2002

Related U.S. Application Data

(60) Provisional application No. 60/258,703, filed on Dec. 28, 2000.

(51) Int. Cl.[7] ............................. A23C 19/00; A01J 25/00
(52) U.S. Cl. ............................ 426/231; 99/452; 99/460; 426/517; 426/582
(58) Field of Search ................................. 426/231, 512, 426/517, 491, 582; 99/452, 454, 456, 458, 460

(56) References Cited

U.S. PATENT DOCUMENTS

| | | | |
|---|---|---|---|
| 3,824,885 A | 7/1974 | Marshall et al. | 83/19 |
| 4,090,646 A | 5/1978 | Dubiel et al. | 222/326 |
| 4,232,051 A | 11/1980 | Hinds, Jr. et al. | 426/582 |
| 4,539,902 A | * 9/1985 | Brockwell et al. | 99/454 |
| 5,001,972 A | * 3/1991 | Greenfield et al. | 99/454 |
| 5,146,845 A | * 9/1992 | Pittelko | 99/454 |
| 5,363,746 A | 11/1994 | Gordon | 99/328 |
| 5,572,925 A | 11/1996 | Van Pay et al. | 99/454 |
| 6,180,153 B1 | 1/2001 | Palus et al. | 426/517 |

* cited by examiner

Primary Examiner—George C. Yeung
(74) Attorney, Agent, or Firm—Foley & Lardner LLP

(57) ABSTRACT

Disclosed herein is a food product portioning apparatus comprising: a rotary-to-linear movement device; a support device, such as a platform, connected to the rotary-to-linear movement for receiving the food product thereon and moveable to position the food product at a predetermined height; and a cutting apparatus to portion the food product at the predetermined height. Also disclosed is a method of portioning food product at a predetermined size. Applicable food products can include, but are not limited to, cheese and various other soft, malleable, portionable food products.

27 Claims, 5 Drawing Sheets

FOOD PRODUCT PORTIONING

CROSS REFERENCE TO RELATED APPLICATION

This application claims the benefit of U.S. Provisional Application No. 60/258,703 filed Dec. 28, 2000.

BACKGROUND OF THE INVENTION

The present invention generally relates to the portioning of food product into portions having a predetermined size. In one aspect, the invention relates to forming cheese blocks of a predetermined size in a cheese block former.

Food products are often produced in portions of predetermined size, the size corresponding to a particular weight, e.g., a 1-lb block, 2-lb block and so forth. One food product that is typically produced in portions of predetermined size is cheese. Cheese block formers are commonly used to produce large blocks or block portions of a variety of types of cheeses (e.g., cheddar, colby, monterey jack, mozzarella, brick, muenster, among others). They generally do so by means of providing a tower or column having a large interior area. Various aspects of cheese block formers are generally known and are taught in U.S. Pat. Nos. 5,572,925 and 6,180,153 each of which is incorporated herein by reference.

At the top of the tower, a mixture of curd and whey is typically fed into the column under a vacuum. As the mixture flows down through the column, the whey is drained or otherwise extracted from the mixture. The curd, usually under its own weight, becomes a solid pillar of cheese as it flows in a downward direction through the column. More specifically, as the height of the pillar of curd increases within the column, the curd in the lower portion of the pillar is compressed by the weight of superimposed curd such that additional whey is pressed out of the pillar and the curd is consolidated into a compacted cheese pillar. The pillar or column of cheese is then cut into blocks using a cutting apparatus, such as a guillotine blade, often located adjacent the bottom of the tower. Thus, the cutting typically takes place near the bottom of the tower section. Following cutting, the cheese blocks are prepared for packaging and later shipment. A block former can be designed for independent operation and/or for operation in conjunction with one or more additional cheese block formers.

As noted above, cheese blocks are cut into a predetermined size to provide a block having a particular weight. Since the interior of the column determines a known, fixed space in which to permit cheese to flow down and through, obtaining a cheese block of the predetermined size can be accomplished by portioning or cutting the cheese column at a distance or height that corresponds to a predetermined height. Of course, this presupposes that the block formers effectively produce cheese blocks having consistent weights and uniform moisture content from block to block. Assuming this to be the case, an actuator in operative association with the block former causes the lowering of the cheese block the distance corresponding to the predetermined cheese block height. The actuator is typically located inside of a finishing station, which is often disposed adjacent, and usually below, the tower.

In the past, pneumatic actuators have been used to control and adjust the distance that the cheese block is lowered within the column to achieve a desired or predetermined height. These pneumatic devices, however, have been limited at least insofar as they have not provided a wide control range over which the block heights can be controlled or adjusted to achieve the desired weight. In addition, they have not provided the necessary control over the block lowering/raising speed as the block is raised or lowered to a height corresponding to the predetermined height. Servo-controlled linear actuators have also been utilized to control the block sizing operation. However, since servo-controlled linear actuators lack absolute feedback, they too have proven to be less than adequate in obtaining properly sized blocks of cheese (i.e., cheese blocks corresponding to the predetermined height). For instance, servo-controlled actuators require "homing", meaning that they need to be brought to a known and repeatable position every time the power is turned off and back on again. In addition, servo-controlled actuators are typically quite complex and costly to implement.

Accordingly, it would be desirable to design a device that can provide properly-sized portions of food products, such as cheese. The device would ideally solve the aforementioned problems, thus allowing even rather large blocks of cheese, or other like food product portions, to be produced in a cost effective, rapid, and reliable manner. Such a device would ideally be rugged and easy to use, thereby permitting the cheese blocks or other food product portions to be produced with a minimum of apparatus downtime.

SUMMARY

The present invention generally provides for the portioning of food products, such as cheese, into portions of predetermined size. More specifically, the invention provides for food product portioning which overcomes the aforementioned problems.

Various embodiments of the present invention include, but are not limited to: a cheese block former comprising a finishing station; a cheese block former for making large blocks of bulk cheese from a cheese curd mixture, the former having a finishing station; a cheese block portioning station; a finishing station for use with a food product; a food product portioning apparatus; a method of portioning a column of cheese to obtain a cheese block of a desired size; and a method of portioning food product at a predetermined size, among others.

Generally, a device, system, and method that permits a food product, such as cheese, to be portioned without the need for homing is provided. Accordingly, in one embodiment for food product portioning is accompanied by effectively and appropriately controlling the weight of food products, such as cheese, in response to the food product height. Flexibility is provided to an end user, as least one aspect of the flexibility characterized in that the end user can obtain a desired food product portion, the portion corresponding to a predetermined food product portion height. A system is provided that permits a food product to be portioned at a programmable speed. A properly-portioned food product, such as cheese, can be provided by an apparatus that permits an infinitely adjustable and programmable food product size corresponding to a programmable food product height. Portioning of a food product, such as cheese, is accomplished in a manner that is cost effective, simple to implement and operate, and rugged, so as to minimize any downtime.

Various other features and aspects of the embodiments will be made apparent from the following detailed description and the drawings.

BRIEF DESCRIPTION OF THE DRAWINGS

The drawings illustrate the best mode presently contemplated for carrying out the invention.

In the drawings.

DETAILED DESCRIPTION OF THE PREFERRED EMBODIMENTS

In the detailed description of this invention, like numerals are employed to designate like parts throughout the same. Various items of equipment, such as fasteners, fittings, etc., in addition to various other elements and specific principles of their operation are omitted to simplify the description. However, those skilled in the art will realize that such conventional equipment and principles of operation can be employed as desired. It is understood that the described cheese block former can be utilized with a variety of food products. For purposes of explanation only, the operation of the block former for producing cheese blocks is described herein.

Figures 1, 2:
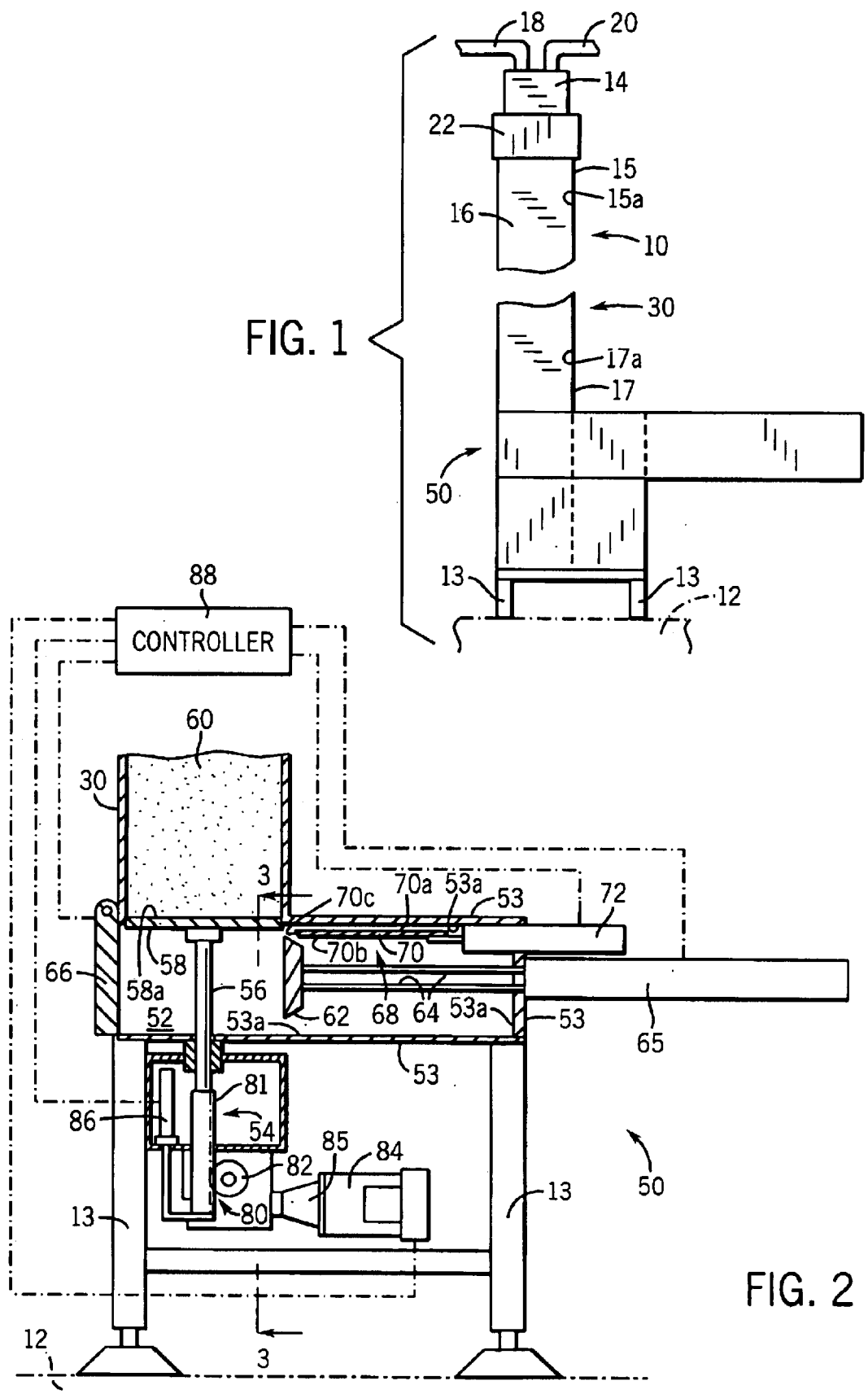
FIG. 1 is a schematic front view of a portion of a cheese block former according to one aspect of the invention.
FIG. 2 is a detailed partial schematic view of one embodiment of a lower portion of FIG. 1 comprising a finishing station.

FIG. 1 shows a cheese block former 10 situated adjacent to, and more particularly on top of, a finishing station 50, which itself is positioned on a base 12 and supported by supporting legs 13. As shown, the cheese block former includes an upper tower section 14 and a lower tower section 16, which together form tower 30. A block former comprising a single tower section is contemplated for use with the present invention. The block former further includes a curd feed inlet tube 18 to supply curd feed into the cheese block former, as well as a vacuum port 20 to draw curd into upper tower section 14 of the cheese block former from upstream equipment (not shown). Lower tower section 16 typically can include a vacuum port (not shown) connected to a source for providing vacuum (also not shown) that is used to draw whey away from the curd. Upper tower section 14 includes wall 15 having inner surface 15a. Lower tower section 16 includes wall 17 having inner surface 17a. The respective inner surfaces 15a and 17 define the interior area of the tower for holding and forming the cheese curd as it flows down through the column.

While it should be understood that the cheese block former can be designed to include only a single tower section, if the tower includes upper and lower tower sections (as is shown), the sections can be separated by a vacuum separator 22. A vacuum separator can permit different pressures to exist simultaneously in the upper and lower tower sections. The separator can comprise a mechanism such as a valve to permit the pressure differential. Alternatively, the separator can comprise a straight-through chute, which can include a rectangular, circular, or oval-shaped chute, as well as a cylinder, a tube, or any other similar type of hollow material conveying apparatus. U. S. Pat. No. 6,108,153 describes such cheese block formers in greater detail.

Referring to FIG. 2, a detailed, partially schematic, view of the finishing station 50 is shown. The finishing station provides a sanitary area in which cheese block cutting, portioning, and pressing can take place. The station comprises an inner chamber 52 defined by an interior surface 53a of housing 53, which is a housing supported by legs 13, which, as mentioned above, rest on base 12. An elevator 54 having an elevator shaft or arm 56 can retract downwardly and extend upwardly through the inner chamber 52. The elevator movement is further characterized in that, with respect to the illustrated embodiment, it is coaxial with respect to the tower 30. Elevator arm 56 is attached to, at its top end, a platform 58 having an upper surface 58a upon which food product, such as the bottom portion of cheese column 60, can rest. Mechanical ejection ram 62, operable here by a two-pronged shaft 64, is connected to and driven by a piston or other actuator 65. Ejection ram 62, as illustrated, is aligned to extend and move linearly through inner chamber 52 to push a food portion, such as a cheese block, out access/exit door 66. This will be discussed further in the description that follows.

Cutting apparatus 68 includes a guillotine or blade member 70 having top surface 70a bottom surface 70b and cutting edge 70c. The cutting edge is preferably beveled with the leading edge adjacent to the top surface of the blade so as to facilitate the cutting of the cheese column into an appropriately-sized block of cheese. An actuating device 72, such as a piston, can be used to move blade 70 between a first or retracted position (as is illustrated in FIG. 2) in which the finishing station chamber 52 is in communication with the lower tower section 16 above it (when the elevator 54 is retracted), and a second or extended position (not shown) in which the finishing station chamber 52 is closed off to the lower tower section 16. Movement of the blade 70 is described in greater detail below.

Figure 3:
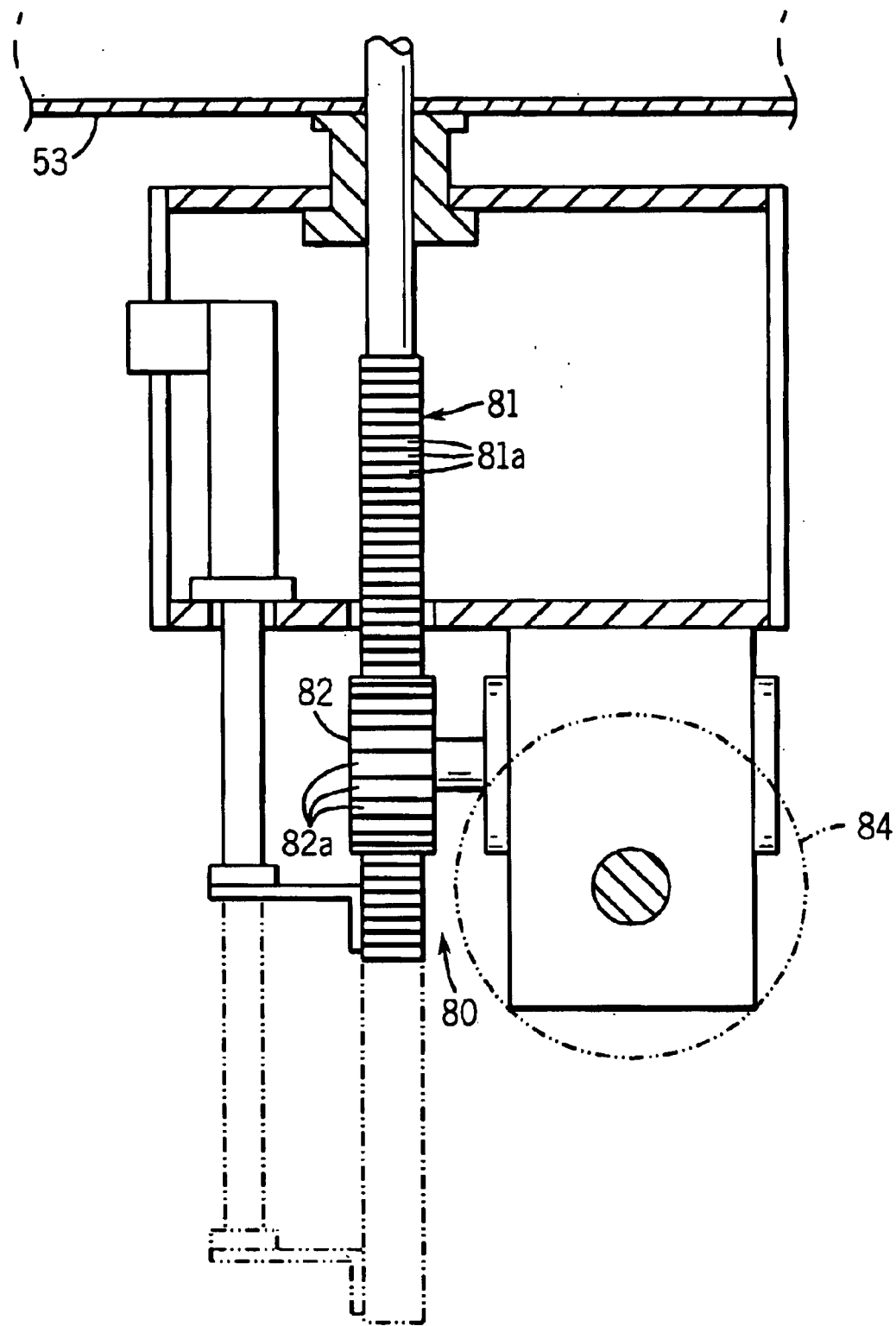
FIG. 3 is a partial cross-sectional view taken along line 3—3 of FIG. 2.

Referring now to both FIGS. 2 and 3, FIG. 3 illustrating a partial cross-sectional view taken along line 3—3 of FIG. 2, the finishing station also includes a rotary-to-linear actuator 80. The rotary to linear actuator raises and/or lowers the elevator platform 58, thereby raising and/or lowering the food product 60 resting thereon, such as the exemplary cheese of the illustrated embodiment. In a preferred embodiment, the rotary-to-linear actuator 80 comprises a rack and pinion assembly having a rack portion 81 comprising teeth 81a (seen in FIG. 3) that mesh or engage teeth 82a (seen in FIG. 3) of pinion portion 82. The rack portion 81 is preferably coupled directly to elevator arm 56 such that movement of the rack corresponds with movement of the arm. The rack 81 is preferably made of stainless steel. The pinion portion 82 is also preferably made of a stainless steel material, or alternatively, a composite material. Other suitable rotary-to-linear actuators can include, but are not limited to, ballscrews, jackscrews, and the like (none of which are not illustrated separately herein).

Still referring to FIGS. 2 and 3, motor 84 (shown in phantom in FIG. 3) and gearbox 85, which are typically fixedly connected to the finishing station 50, are used to drive pinion portion 82. The pinion portion in turn drives rack portion 81. In one preferred embodiment, the motor uses or incorporates a Variable Frequency Drive, or "VFD", which is described further below. One suitable motor for use in the present invention is a one (1) horsepower HP motor, three (3)-phase motor. A servomotor, dc motor, or other similar devices can also work to drive the rotary-to-linear actuator.

A linear transducer, as noted previously, is an electronic position sensing means that can transmit a signal representative of an object's position. As shown in FIG. 2, absolute feedback of a cheese column displacement (upward or downward) is preferably obtained via linear transducer 86. Here, the linear transducer is in operative association with the rack portion 81, the rack portion is directly coupled to the elevator shaft 56 and the cheese tower or column 30 rests on the elevator shaft. Therefore, by sensing the position of the rack portion 81, the linear transducer 86 can sense a signal that is representative of a cheese pillar displacement. This displacement corresponds to the height of the to-be-cut cheese block or other food product portion, and thus, as a practical matter, the linear transducer can sense and transmit a signal representative of the cheese or other food product portion height.

In one preferred embodiment, the linear transducer 86 is a Linear Variable Displacement Transducer, or "LVDT". Such a transducer itself can preferably include an ultrasonic time-of-flight sensor, a linear resistive element (for example, a reostat or potentiometer) and a magnet to obtain requisite position information. One linear transducer suitable for use in the present invention is a magnetostrictive transducer, available from Patriot Tm, located in Clawson, Mich.

Referring to FIG. 2, the linear transducer is in operative association with a controller 88, for example, a Programmable Logic Controller ("PLC"). The controller, as shown, is also in operative association with motor 84, blade actuator 72, shaft actuator 65, and transducer 86. The controller can use the absolute feedback signal representative of the food product height to control these elements (described further below).

Figure 4A:
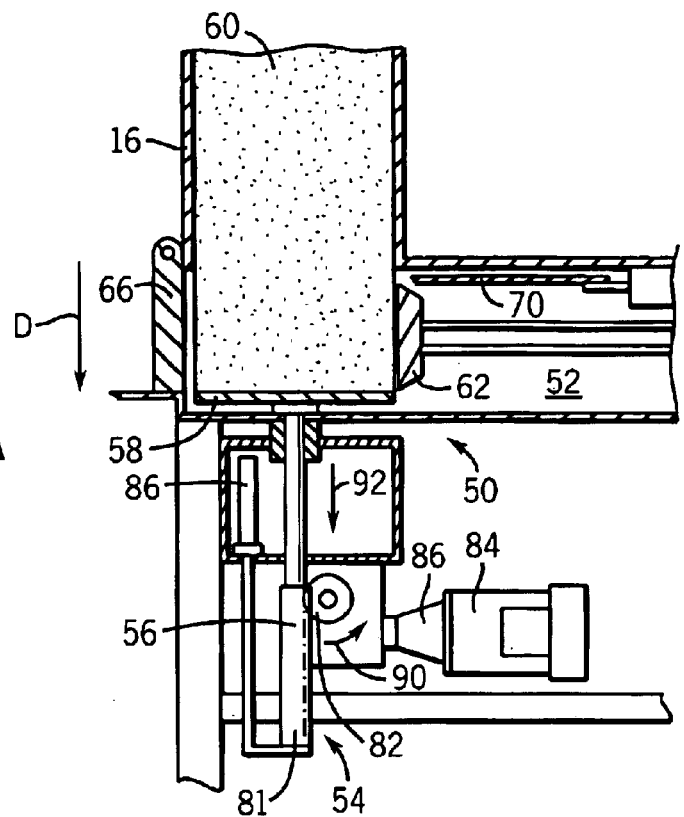
FIG. 4A is a partial schematic cross-sectional view of a finishing station showing the cheese prior to being portioned into a cheese block.
Figure 4B:
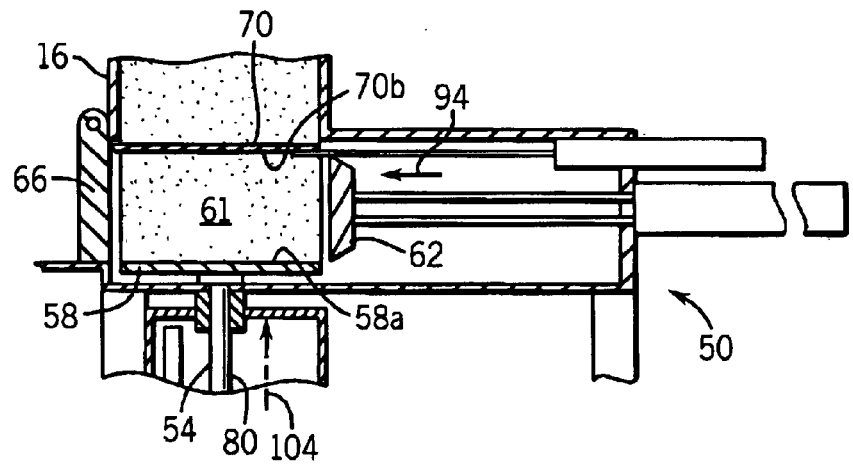
FIG. 4B is a partial cross-sectional view of a finishing station showing the cheese being portioned into a cheese block.
Figure 4C:
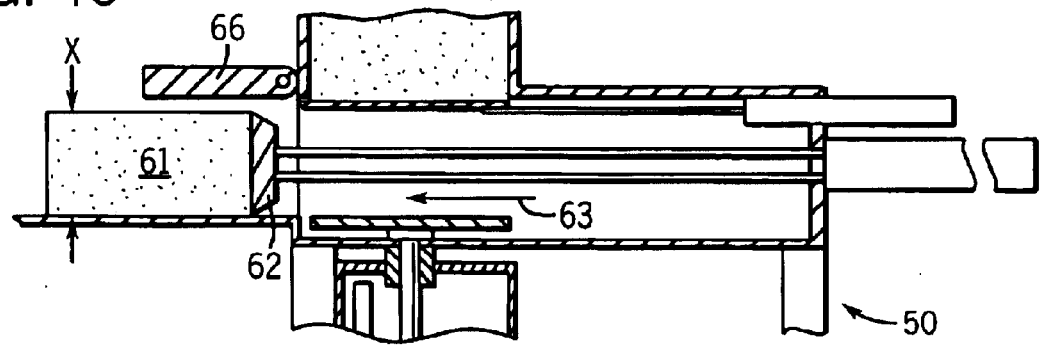
FIG. 4C is a partial cross-sectional view of a finishing station showing a cheese block being discharged.

To begin the cheese block portioning process, a desired or predetermined cheese block is established. FIGS. 4A–C show partial schematic cross-sectional views of a portion of a cheese block tower system (i.e. the system in this case defined to include a finishing station 50) the food product (e.g., the cheese) shown as it is portioned to a predetermined size. In particular, FIG. 4A shows the cheese 60 (a lower portion of a cheese column) prior to being portioned into a cheese block 61 of predetermined or desired size. When the column of cheese 60 in the tower section 16 has reached a specified height (detected, for instance, by a separate height sensor that is not illustrated here), blade is withdrawn to permit the column of cheese to be drawn down onto elevator platform 58 under its own weight. At this point, the cheese can be lowered into inner chamber 52 of finishing station via the elevator 54. In general, the distance D the cheese column is lowered prior to its being cut by the cutting apparatus represents the cheese block height. Further, and as noted previously, proper and consistent cheese preparation or forming ensures that this block height corresponds to the weight of the cheese block 61.

As noted above, the linear transducer 86 senses a linear displacement of the rotary-to-linear actuator 80. Using the feedback signal representative of the position of the cheese column 60 that is generated by and transmitted from transducer 86 to the controller (FIG. 2), motor 84 and gearbox 86 move pinion portion 82 in counterclockwise fashion. This rotation is indicated by arrow 90. The VFD which drives the motor receives a control signal that is generated by and transmitted from the controller. The control signal is representative of a speed command to the VFD, which is decelerated as the actuator nears its set-point, i.e., the predetermined height.

In general, rotary-to-linear actuator 80 is driven by motor 84. More specifically, pinion portion 82 is in meshing engagement with rack portion 81, and the rack portion is coupled to elevator arm (shaft) 56 of elevator 54. Thus, pinion portion (82) drives the rack portion 80 to raise and/or lower elevator platform 58 via elevator shaft 56 to which it is coupled. The downward action of the shaft is shown by arrow 92. Ejection ram 62 is in its retracted position and door 66 is closed. It is noted that the phantom lines shown in FIGS. 3 and 4 illustrate an alternative position of the rack portion and transducer.

Referring to FIG. 4B, once elevator 54 (via the rack portion 80) is positioned at a height corresponding to the predetermined height of a cheese block 61, blade 70 is moved to an extended or closed position, and in so doing, the blade cuts a portion of cheese from the lower end of the column of cheese curd 60. This action is shown by arrow 94. Ejection ram 62 remains in its retracted position and door 66 is closed. In FIG. 4C, a cheese block 61 of predetermined height (i.e., having a height "x") is shown discharged from finishing station 50. Ejection ram 62 is in an extended position, as shown by arrow 63, and door 66 is opened, permitting the cheese block to be pushed or otherwise forced out of the finishing station where it can be bagged or transported for further handling (not shown).

Figure 5A:
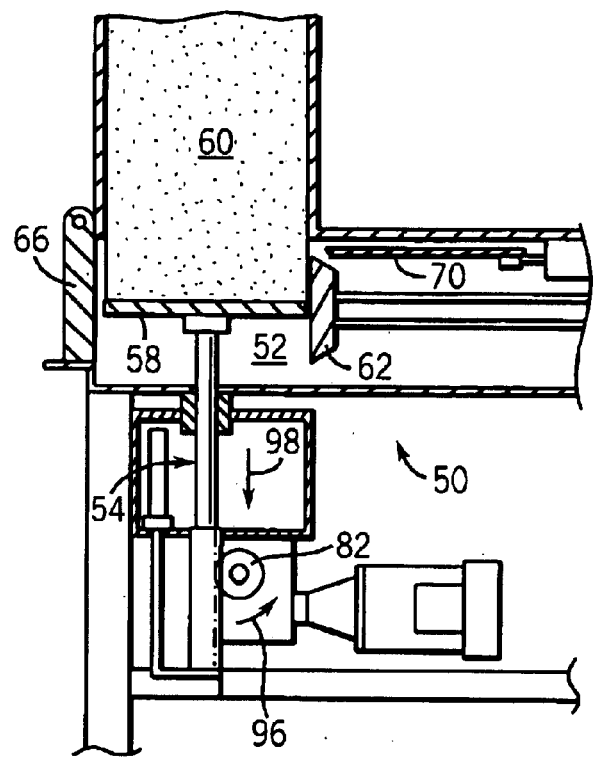
FIG. 5A is a partial cross-sectional view of a portion of a finishing station showing the cheese as it is lowered prior to being portioned into a cheese block.

FIGS. 5A–5D are also partial schematic cross-sectional views of a portion of the finishing station 50. In these figures, cheese column 60 is shown being portioned to a cheese block 61a having height x' (versus height x of FIGS. 4A–4C). In FIG. 5A, cheese column 60 rests on platform 58 of elevator 54. Blade 70 is in an "open" or retracted position. Pinion portion 82 moves in a counterclockwise fashion, as indicated by arrow 96. Elevator 54 is lowered, thereby lowering the cheese column 60. This movement is indicated by downward arrow 98. As described previously, the cheese column is lowered into inner chamber 52 of finishing station 50, ultimately to a height corresponding to a predetermined height of the to-be-cut cheese block 61. As noted earlier, this height corresponds to the desired weight of the cheese block. Ejection ram 62 is in its retracted position and door 66 is closed.

Figure 5B:
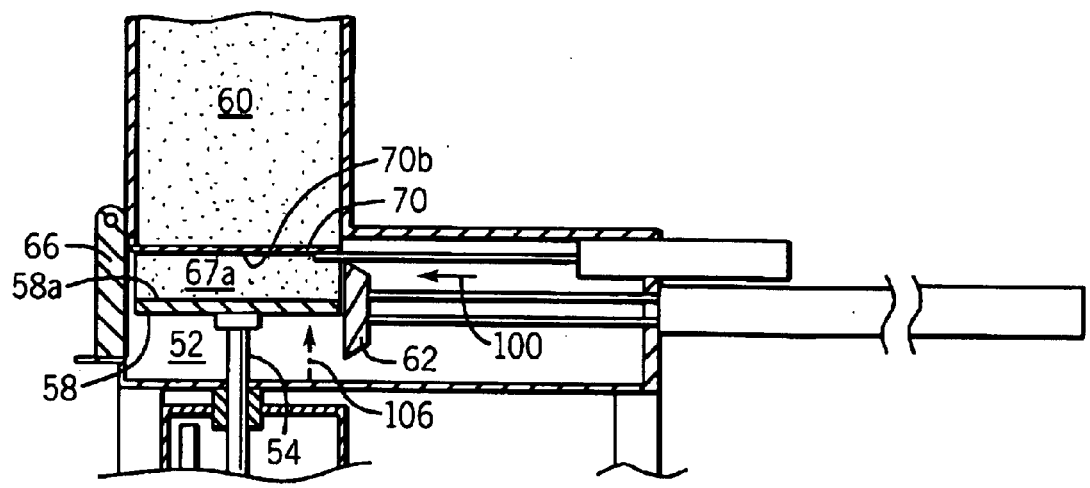
FIG. 5B is a partial cross-sectional view of a portion of FIG. 5A showing the cheese portioned into a properly sized cheese block.
Figure 5C:
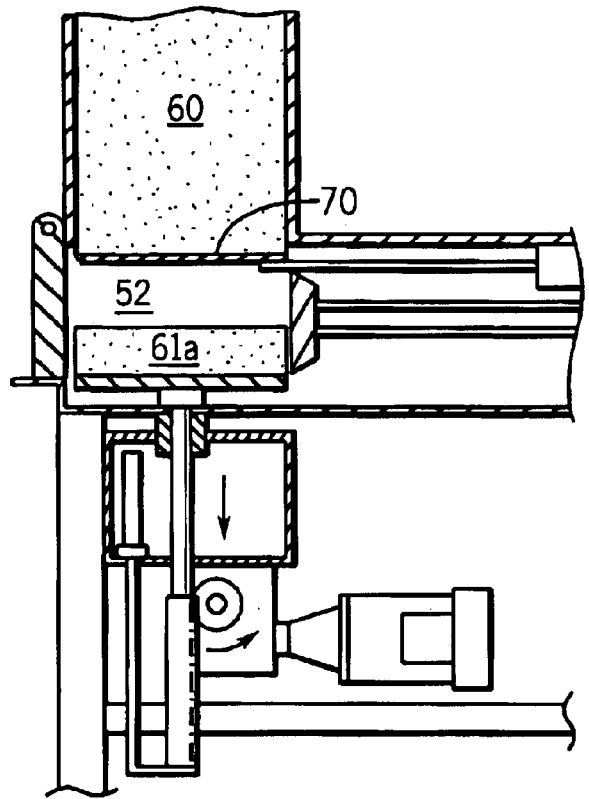
FIG. 5C is a partial cross-sectional view of a portion of FIG. 5A showing a cheese block lowered prior to its discharge.
Figure 5D:
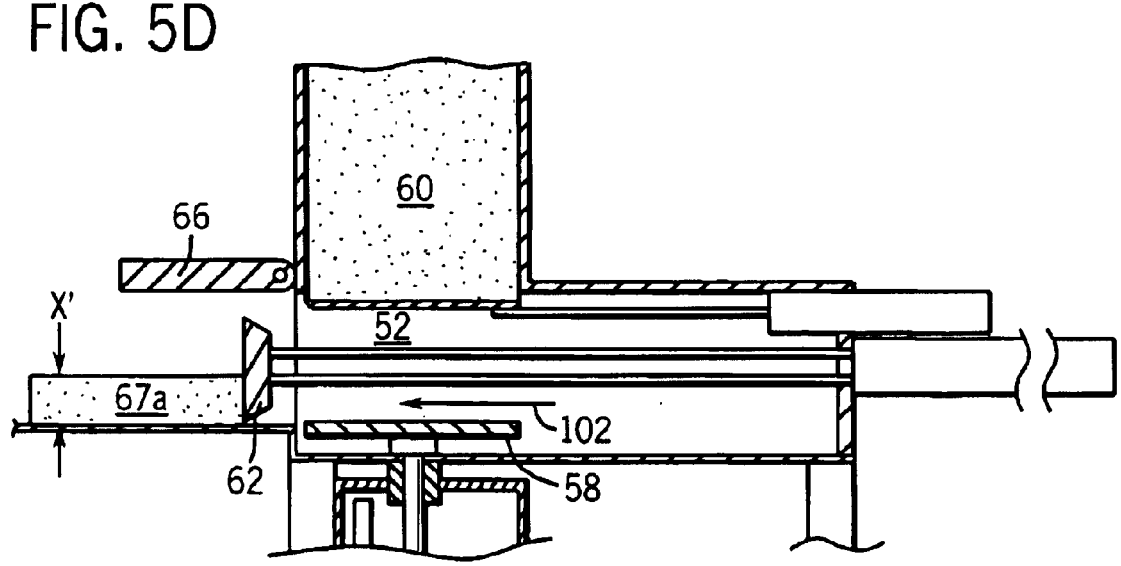
FIG. 5D is a partial cross-sectional view of a portion of FIG. 5A showing a cheese block as it is discharged.

In FIG. 5B, guillotine blade 70 is moved to its closed or extended position, and in so doing, the blade cuts a block of cheese 61a at a height x' corresponding to the desired cheese block height, and thus, weight. This action is illustrated by arrow 100, and once again, ejection ram 62 is in its retracted position and door 66 is closed. It is noted again that the phantom lines shown in FIGS. 5A and 5B illustrate an alternative position of the rack portion 81 and transducer 86. Referring to FIG. 5C, elevator platform 58 is shown being lowered to a retracted position. This is performed so that the block 61a can be properly discharged from the finishing station. And in FIG. 5D, a sized block of cheese 61a is shown, the block having a height x'. The block is shown as it is being discharged from the finishing station. Access door 66 is opened and ejection ram 62 is actuated to push or eject the cheese block out of the finishing station where the block can encounter later handling and/or packaging. This action is shown by arrow 102.

Referring to FIGS. 4B and 5B, in one preferred embodiment, elevator 54 can also lift platform 58 so as to force the cheese block upward against bottom surface 70b of guillotine blade 70 so as to press the cheese block for a predetermined amount of time. Phantom lines 104 and 106 of FIGS. 4B and 5B, respectively, illustrate the compressive force that can be applied to accomplish pressing of the cheese block or other food product as necessary. A cheese block of desired size can be molded to have a finished surface(s) that is appropriate for later packaging. Blade bottom surface 70b, elevator platform top surface 58a, ejection ram 62 and access/exit door 66 can function as such a mold for the cheese block to achieve such obtain finished surface(s).

In summary, weight of cheese blocks can be effectively controlled by the height of the block. An actuator inside of the block-forming machine lowers a column of cheese into a chamber to a predetermined height. In the past the actuator that has controlled this height adjustment has typically been pneumatic. Such pneumatic devices have lacked the necessary feedback to the controller and have been limited in their range of weight control. Other devices that have been utilized for this operation include, for instance, servo-controlled linear actuators. However, these types of actuators have proven to be too complex, expensive, and further, they have required "homing" due to the lack of absolute feedback.

The present invention incorporates a rack and pinion assembly connected to a gearbox and motor. Absolute feedback of position is sent to the controller via a linear transducer. With this feedback, the PLC controls the motor by way of a Variable Frequency Drive (VFD). This gives the end-user what is in essence an infinitely adjustable and programmable block height range, as well as a programmable food product lowering speed.

The present invention results in many advantages over existing concepts currently in place. The rack and pinion actuator assembly provides extreme ruggedness and simplicity and thus can be operated and maintained by fairly easily. In its various embodiments, the present invention provides the flexibility to program a food product height of any size. A column of food product, such as cheese, can be lowered at virtually any programmable desired speed. Absolute feedback from the linear transducer eliminates the need for "homing". The device is also significantly less expensive to manufacture than previous solutions. Off the shelf components can be incorporated such that there is minimal lead-time to and/or from the vendor. More specifically, the invention can include a stainless steel rack driven by a pinion gear that can be made of stainless steel, or alternatively, a composite material. Other concepts that can work for rotary-to-linear assembly include ballscrews jackscrews, or other comparably component. Preferably, a 3-phase motor and gearbox drive the actuator, while a VFD controls the motor speed. Connected to the rack is a linear transducer that sends a signal proportional to the height of the rack to the PLC. Other motors that can be used include, but are not limited to: servo, stepper, AC or DC motors. A platform inside the chamber is attached to a shaft that can preferably be directly coupled to the rack.

A preferred procedure for portioning cheese blocks of a predetermined size is provided here succinct fashion. Initially, the cutting apparatus door is closed and the elevator platform is in its lowered or retracted position (also called a "backed off" position). The elevator and its attached platform are then driven up using the rotary to linear actuator, which itself is in operative association with a motor and gearbox. The cutting blade retracts and opens the column to the inner chamber of the finishing station and the cheese column lowers onto the elevator platform. The platform is then driven via the rotary to linear actuator in conjunction with the transducer, controller and motor to the desired block height. The cutting blade extends or closes so as to cut or portion the cheese block at the desired block height. The elevator is then driven to the lowered or "backed off" position and then driven upward so as to press the block for a period of time. The elevator is then lowered again and the access door opens to eject the cheese block.

An operator interface (not shown) is typically used to provide a means for entering or programming requisite product specifications (e.g., the product type, weight, and the like.) that are to be received by the controller.

The present invention has been described with respect to its use with a cheese block former having a tower through which cheese product can move. However, those skilled in the art will understand that the present invention described in its various embodiments in detail above can function in conjunction with other types of food producing, processing and or handling devices in which food can move as the product is formed, portioned, and/or otherwise handled.

The present invention is not limited to cheese block formers for use with cheese products. It is clear that the present invention can be used with other food products that can be sized or portioned as desired in accordance with the principals and elements described herein. Such other food products can include, for example, tofu, meats or meat products, cheese-like products, various dairy products, and other food products or materials that can be formed into blocks of varying shapes and sizes.

The steps of the methods described and claimed herein are set forth to provide the teachings of best mode and preferred embodiments of the invention, for purposes of clarity and particularity, and are not provided by way of limitation. The steps can be combined, divided, interchanged or otherwise rearranged, with such and other changes alterations and modifications apparent to one of skill in the art and contemplated and within the scope of the present invention.

In general, while the principles of this invention have been described in connection with specific embodiments, it is evident that the description is exemplary and not intended to limit the scope of the invention.

What is claimed is:

1. A cheese block former comprising:
   a tower section with an inner surface and an outer surface, the inner surface defining an interior area, the tower section further having a curd feed inlet to supply curd into the interior area of the tower section to form a column of cheese as the column of cheese is transported downwardly within the interior area and out a lower end of the tower section; and
   a finishing station coupled to the tower section, the station comprising:
      a housing;
      a platform disposed within the housing, the platform to receive the column of cheese thereon and the platform moveable so as to position the column of cheese at a predetermined height;
      a rotary-to-linear actuator connected to the platform to actuate movement of the platform; and
      a cutting member connected to the housing to portion the column of cheese at the predetermined height into a cheese column portion.

2. The cheese block former of claim 1 wherein the rotary-to-linear actuator comprises a rack portion that is in meshing engagement with a pinion portion.

3. The cheese block former of claim 2 wherein the rack portion comprises a characteristic rack height that corresponds to a desired weight of the cheese column portion.

4. The cheese block former of claim 2 further comprising a motor and a gearbox, the motor and gearbox fixedly connected to the finishing station, to drive the pinion portion that is in meshing engagement with the rack portion.

5. The cheese block former of claim 2 wherein the rotary-to-linear actuator comprises one of a ballscrew and a jackscrew.

6. The cheese block former of claim 4 further comprising a gearbox that is in operative association with the motor.

7. The cheese block former of claim 4 wherein the motor is a three-phase, 1 horsepower motor.

8. A cheese block former for continuously making large blocks of bulk cheese from a cheese curd mixture, the cheese block former comprising:

a tower section with a top end and a bottom end, an outer surface and an inner surface, and an interior area, the tower section further having a curd feed inlet to provide curd to the interior area;

a cutting member having a moveable blade member positioned at the bottom end of the tower section, the cutting member operable between a first position in which the blade closes the bottom end of the tower section and an open position in which the blade is withdrawn from the bottom end of the tower section; and a finishing station coupled to the tower section, the station comprising:
    a rotary-to-linear actuator;
    a cutting member; and
    a platform connected to the rotary-to-linear actuator, the platform structured to receive the column of cheese thereon, and the platform moveable so as to position the column of cheese at a predetermined height relative to the blade of the cutting member.

9. The cheese block former of claim 8 wherein the rotary-to-linear actuator comprises a rack portion that is in meshing engagement with a pinion portion.

10. The cheese block former of claim 8 wherein the rack portion comprises a characteristic height that corresponds to a desired weight of the cheese column portion.

11. The cheese block former of claim 9 wherein the rotary-to-linear actuator comprises a ballscrew.

12. A cheese block portioning station comprising:
  a rotary-to-linear actuator;
  a platform connected to the rotary-to-linear actuator, the platform for receiving a cheese column thereon, and the platform moveable to position the column of cheese at a predetermined height; and
  a cutting member to portion the column of cheese at the predetermined height.

13. The cheese block portioning station of claim 12 wherein the rotary-to-linear actuator comprises a rack portion that is in meshing engagement with a pinion portion.

14. The cheese block portioning station of claim 13 wherein the rack portion comprises a characteristic height that corresponds to a desired weight of the cheese column portion.

15. The cheese block portioning station of claim 13 wherein the rotary-to-linear actuator comprises a jackscrew.

16. A finishing station for use with a food product is provided, the station comprising:
  a rotary-to-linear actuator;
  a cutting member; and
  a platform to receive the food product thereon, the platform connected to the rotary-to-linear actuator and operable to position the food product at a predetermined height relative to the cutting member for portioning the food product at the predetermined height to obtain a food product portion having a desired size.

17. The finishing station of claim 16 wherein the rotary-to-linear actuator comprises a rack portion that is in meshing engagement with a pinion portion.

18. The finishing station of claim 17 wherein the rack portion comprises a characteristic height that corresponds to a desired weight of the food product portion.

19. The finishing station of claim 17 wherein the rotary-to-linear actuator comprises a ballscrew or a jackscrew.

20. A method of portioning a column of cheese to obtain a cheese block of a desired size, the method comprising:
  providing a cheese block former;
  providing a column of cheese within the former;
  establishing a predetermined cheese block height corresponding to a desired cheese block size;
  programming the block former with cheese block information, the information including the predetermined cheese block height;
  sensing, using a linear transducer, a linear displacement of a rotary-to-linear actuator, the linear displacement representative of an actual cheese block height;
  generating, via the linear transducer, a feedback signal representative of the actual cheese block height;
  transmitting the feedback signal from the linear transducer to a controller;
  generating, via the controller, a control signal that is representative of a cheese block height adjustment amount in response to the feedback signal;
  transmitting the control signal representative of the height adjustment amount from the controller to a drive in operable association with a motor;
  using the control signal to adjust a speed of the motor;
  driving the rotary-to-linear actuator using the motor;
  moving a platform for supporting the column of cheese to a distance corresponding to the block height adjustment amount using the rotary-to-linear actuator so as to adjust the actual cheese block height to correspond with the predetermined cheese block height; and
  cutting the column of cheese at the predetermined cheese block height to obtain the cheese block at the desired size.

21. The method of claim 20 further comprising: generating a cutting signal when the platform has been moved the distance corresponding to the block height adjustment amount and height and actuating a cutting blade in response to the cutting signal.

22. The method of claim 20 further comprising:
  transmitting the feedback signal to a programmable logic controller ("PLC") to control the motor speed.

23. A method of portioning food product at a predetermined size, the method comprising:
  establishing a predetermined food portion height corresponding to a desired food portion size;
  programming requisite food product specifications;
  sensing, using a linear transducer, a linear displacement of a rotary to linear actuator, the linear displacement representative of a food portion height;
  generating, via the linear transducer, a feedback signal representative of the food portion height;

transmitting the feedback signal from the linear transducer to a controller;

generating, via the controller, a control signal that is representative of a food portion height adjustment amount in response to the feedback signal;

transmitting the control signal from the controller to a drive in operable association with a motor;

using the control signal to adjust a speed of the motor;

driving the rotary to linear actuator with the motor;

using the rotary to linear actuator to adjust the food portion height to correspond with the predetermined food portion height; and cutting the food product at the predetermined food portion height to obtain the food portion having the desired size.

24. The method of claim 23 further comprising: generating a cutting signal when the food portion height corresponds with the predetermined food portion height actuating a cutting blade in response to the cutting signal.

25. The method of claim 23 further comprising:

transmitting the feedback signal to a programmable logic controller ("PLC") to control the motor speed.

26. A food product portioning apparatus comprising:

means for establishing a predetermined food portion height corresponding to a desired food portion size;

means for programming requisite food product specifications;

means for sensing, using a linear transducer, a linear displacement of a rotary to linear actuator, the linear displacement representative of a food portion height;

means for generating, via the linear transducer, a feedback signal representative of the food portion height;

means for transmitting the feedback signal from the linear transducer to a controller;

means for generating, via the controller, a control signal that is representative of a food portion height adjustment amount in response to the feedback signal;

means for transmitting the control signal from the controller to a drive in operable association with a motor;

means for using the control signal to adjust a speed of the motor;

means for driving the rotary to linear actuator with the motor;

means for using the rotary to linear actuator to adjust the food portion height to correspond with the predetermined food portion height; and means for cutting the food product at the predetermined food portion height to obtain the food portion having the desired size.

27. A food product portioning apparatus comprising:

a rotary-to-linear movement means;

a support means connected to the rotary-to-linear movement means, the support means for receiving a food product thereon, and the support means moveable to position the food product at a predetermined height; and a cutting means to portion the food product at the predetermined height.

* * * * *